United States Patent
Fedirchuk et al.

(10) Patent No.: US 6,675,108 B2
(45) Date of Patent: Jan. 6, 2004

(54) LINE FAULT PROTECTION UNIT FOR AN ELECTRICAL POWER SYSTEM

(75) Inventors: David James Fedirchuk, Ille Des Chenes (CA); James Wood, Winnipeg (CA)

(73) Assignee: NXT Phase Corporation, Vancouver (CA)

( * ) Notice: Subject to any disclaimer, the term of this patent is extended or adjusted under 35 U.S.C. 154(b) by 237 days.

(21) Appl. No.: 09/977,258

(22) Filed: Oct. 16, 2001

(65) Prior Publication Data

US 2003/0074147 A1 Apr. 17, 2003

(51) Int. Cl.$^7$ .............................................. G06F 17/40
(52) U.S. Cl. ......................................... 702/33; 324/500
(58) Field of Search .............................. 702/33, 34, 35, 702/57, 58, 59, 60, 61, 62, 64, 65, 182, 183; 324/500, 521, 522, 523, 76.11, 76.12, 508; 361/62

(56) References Cited

U.S. PATENT DOCUMENTS 4,796,027 A * 1/1989 Smith-Vaniz .......... 340/870.03
5,182,547 A * 1/1993 Griffith ....................... 340/664
5,940,257 A * 8/1999 Zavis ......................... 361/42
6,292,717 B1 * 9/2001 Alexander et al. .......... 700/293

* cited by examiner

Primary Examiner—Marc S. Hoff
Assistant Examiner—Edward Raymond
(74) Attorney, Agent, or Firm—Robert A. Pajak

(57) ABSTRACT

In a line protection unit for monitoring fault conditions of an electrical power line and actuating breakers to disconnect the line from a power supply bus, the supply bus is in the ring bus arrangement including a first bus and an auxiliary bus so that each power line includes first and second breakers. The three phase current in the line is monitored at both the breakers and summed in the unit to allow calculation of the fault conditions based upon the total current in the line. In the event of a fault condition, both breakers are tripped. In the event of breaker failure so that current continues to flow, this is detected in the unit and all the first breakers tripped to prevent the faulty breaker from allowing current to flow to the faulty line.

4 Claims, 3 Drawing Sheets

LINE FAULT PROTECTION UNIT FOR AN ELECTRICAL POWER SYSTEM

This invention relates to a monitoring unit for use in protecting against line faults in an electrical power supply system and to a method for protection.

BACKGROUND OF THE INVENTION

In electrical power supply systems which supply three phase voltage to a series of supply lines, it is common to provide at a supply station what is known as a ring bus arrangement for connection of the current between the lines and the station bus.

It will be appreciated that the lines can be supply lines supplying to the bus or can be feeder lines taking current from the bus and the present arrangement is designed to provide protection for the line whether it is a supply line or a feeder line.

The ring bus arrangement provides a first bus and a second auxiliary bus each of which can provide the connection for the current. Thus each line is connected to both the first bus and the auxiliary bus and can receive current from or supply current to the ring bus assembly defined by those two separate buses.

A breaker is provided between the line and each of the buses so as to disconnect current when required for the switching scheme employed at the station or in a fault condition.

For approximately twenty years there has been provided for the above system a breaker fail scheme which is responsive to failure of one of the breakers of the ring bus to properly open and to ensure that current can no longer flow between the line and either of the buses.

The protection scheme further includes current transformers or sensors which detect current flowing between the buses and the line. These currents and a signal representative of the voltage on the line are communicated to a relay which carries out various calculations of known algorithms for detecting the presence of a fault condition and for actuating opening of the breakers when required as the fault condition is detected.

In recent years developments for the protection system have improved in that the availability of digital processing has allowed a single monitoring unit to receive information concerning the current and voltage on the line and to carry out the necessary algorithms digitally for providing the output trip signal in the event of a fault condition being detected.

One example of a device of this type is manufactured by APT Power Transmissions of Manitoba Canada which is a part of NxtPHASE Corporation of BC Canada and is sold under the trademark "L-Pro Line Relay". Details of this device are known to one skilled in the art and can be determined from the device itself or from literature describing the device which is publicly available.

One example of an improvement of a device of this nature is shown in co-pending application entitled "MONITORING WIDE AREA DYNAMIC SWING RECORDINGS ON AN ELECTRICAL POWER SYSTEM", filed Sep. 22, 2000, Ser. No. 09/667,582, the disclosure of which is incorporated herein by reference.

The algorithms necessary for calculating a fault condition are well known and have been long established in textbooks on the subject and have been allocated device numbers as set out in standard IEEE C37.2-1979.

One example of the prior art scheme is shown and described in relation to FIG. 1 hereinafter. However this arrangement has the disadvantage that it is necessary to provide a separate breaker fail protection scheme independent of the line protection system which has a number of significant disadvantages as set forth hereinafter.

SUMMARY OF THE INVENTION

It is one object of the present invention therefore to provide an improved monitoring apparatus for use in protecting against line faults in an electrical power supply system and to a method for protection.

According to one aspect of the invention there is provided an apparatus for monitoring current flow in a power supply line of a three phase electrical power system and for controlling circuit breakers to provided protection for the system, the system comprising:

a ring bus assembly including a first bus and an auxiliary bus;

a plurality of three phase power supply lines each connected to the first bus and to the auxiliary bus for communicate power current between the respective line and the ring bus assembly;

a plurality of first circuit breakers each connected between a respective one of the lines and the first bus for disconnecting flow of current therebetween;

a plurality of second circuit breakers each connected between a respective one of the lines and the auxiliary bus for disconnecting flow of current therebetween;

a first plurality of current sensors each responsive to the three phase current flow between the first bus and a respective one of the lines to provide three outputs indicative of the A-phase, B-phase and C-phase respectively of the three phase current flow;

a second plurality of current sensors each responsive to the three phase current flow between the auxiliary bus and a respective one of the lines to provide three outputs indicative of the A-phase, B-phase and C-phase respectively of the three phase current flow;

and a plurality of voltage sensors each responsive to the voltage on a respective one of the lines to provide a voltage output indicative thereof;

the apparatus comprising a monitoring and control unit associated with a respective one of the lines having:

six current input terminals each for receiving a respective one of the three outputs of the first current sensor and the three outputs of the second current sensor associated with said respective one of the lines;

a voltage input terminal for receiving the voltage output of the voltage sensor associated with said respective one of the lines;

detector means in the unit responsive to the outputs from the terminals for generating data indicative of the instantaneous values of the voltage and of the six currents defined by the A-phase, B-phase and C-phase currents of the first sensor and the A-phase, B-phase and C-phase currents of the second sensor;

summation means in the unit for summing the two A-phases to define an A-phase summed value, the two B- phases to define an B-phase summed value and the two C-phases to define an C-phase summed value;

calculation means in the unit for effecting predetermined algorithmic calculations on the voltage, the A-phase summed value, on the B-phase summed value and on the C-phase summed value to determine a fault condition;

a trip output generator for generating a trip output in response to said fault condition for tripping both the circuit breakers associated with said respective line;

recording means for recording data relating to said six current values in the event of a fault condition;

said calculation means being arranged, in the event of a trip output, to detect current values defined by the A-phase, B-phase and C-phase currents of the first sensor which are greater than zero and to provide a first breaker fail output for tripping all the first circuit breakers.

said calculation means being arranged, in the event of a trip output, to detect current values defined by the A-phase, B-phase and C-phase currents of the second sensor which are greater than zero and to provide a second breaker fail output for tripping all the second circuit breakers.

According to a second aspect of the invention there is provided a method comprising:

providing a ring bus assembly including a first bus and an auxiliary bus;

providing a plurality of three phase power supply lines;

connecting each three phase power supply line to the first bus and to the auxiliary bus for communicating power current between the respective line and the ring bus assembly;

locating between each one of the lines and the first bus a respective one of a plurality of first circuit breakers for disconnecting flow of current therebetween;

locating between each one of the lines and the auxiliary bus a respective one of a plurality of second circuit breakers for disconnecting flow of current therebetween;

providing a first plurality of current sensors each responsive to the three phase current flow between the first bus and a respective one of the lines to provide three outputs indicative of the A-phase, B-phase and C-phase respectively of the three phase current flow;

providing a second plurality of current sensors each responsive to the three phase current flow between the auxiliary bus and a respective one of the lines to provide three outputs indicative of the A-phase, B-phase and C-phase respectively of the three phase current flow;

providing a plurality of voltage sensors each responsive to the voltage on a respective one of the lines to provide a voltage output indicative thereof;

providing a plurality of monitoring and control units each associated with a respective one of the lines;

providing on each unit six current input terminals and connecting thereto a respective one of the three outputs of the first current sensor and the three outputs of the second current sensor associated with said respective one of the lines;

providing on each unit a voltage input terminal and connecting thereto the voltage output of the voltage sensor associated with said respective one of the lines;

in response to the outputs from the terminals, generating data indicative of the instantaneous values of the voltage and of the six currents defined by the A-phase, B-phase and C-phase currents of the first sensor and the A-phase, B-phase and C-phase currents of the second sensor;

in each unit effecting summing of the two A-phases to define an A-phase summed value, of the two B-phases to define an B-phase summed value and of the two C-phases to define an C-phase summed value;

in each unit effecting pre-determined algorithmic calculations on the voltage, the A-phase summed value, on the B-phase summed value and on the C-phase summed value to determine a fault condition;

in each unit generating a trip output in response to said fault condition for tripping both the circuit breakers associated with said respective line;

in the event of a fault condition, recording data relating to said six current values;

in the event of a trip output, detecting current values defined by the A-phase, B-phase and C-phase currents of the first sensor which are greater than zero in response thereto generating a first breaker fail output for tripping all the first circuit breakers;

and in the event of a trip output, detecting current values defined by the A-phase, B-phase and C-phase currents of the second sensor which are greater than zero in response thereto generating a second breaker fail output for tripping all the second circuit breakers.

Preferably the first breaker fail outputs are communicated directly to the first breakers and the second breaker fail outputs are communicated directly to the second breakers.

Preferably the currents are calculated in the unit to define a digital value and summed digitally.

BRIEF DESCRIPTION OF THE DRAWINGS

One embodiment of the invention will now be described in conjunction with the accompanying drawings in which.

DETAILED DESCRIPTION OF PREFERRED EMBODIMENTS

Figure 1:
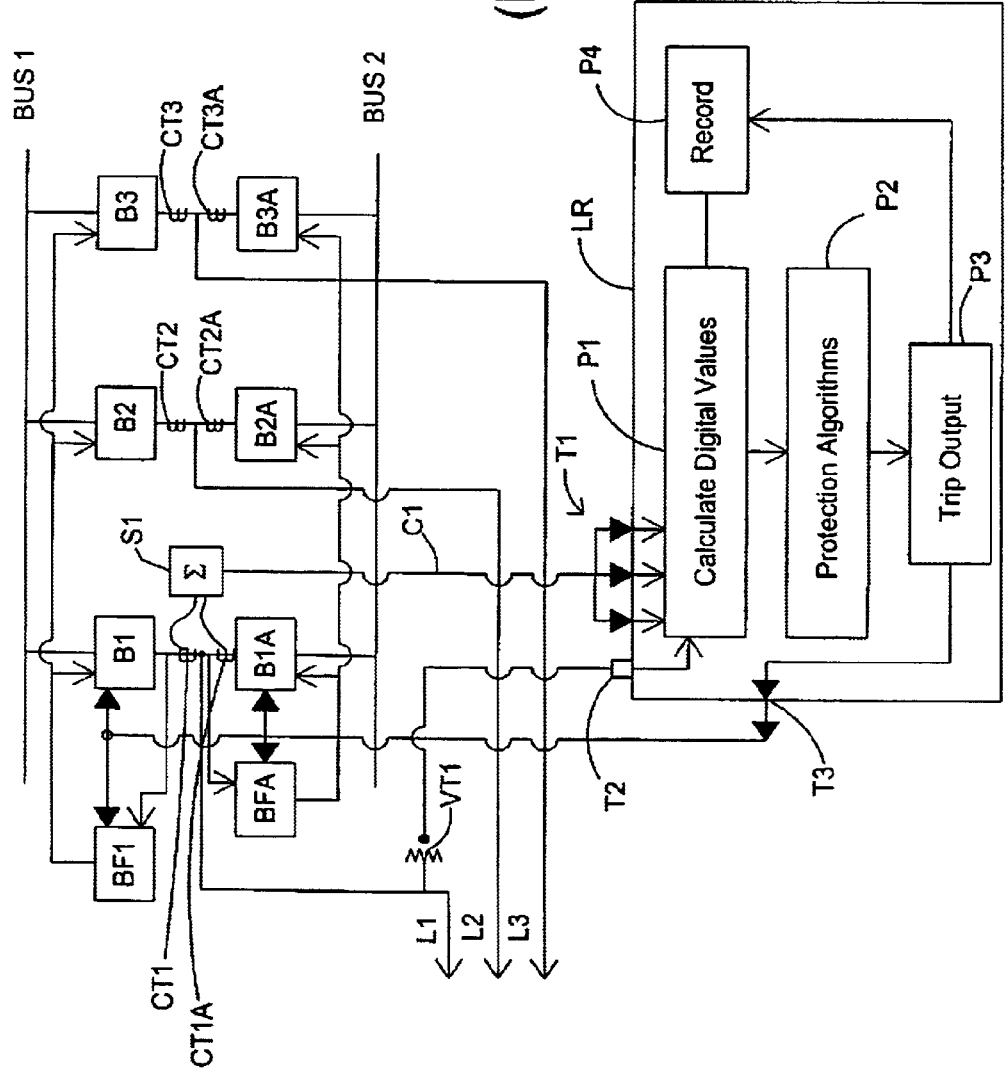
FIG. 1 is a schematic illustration of a prior art scheme for protecting against line faults in a three phase electrical power system.

In FIG. 1 is shown a prior art protection scheme for a ring bus arrangement. In the example shown the ring bus includes a first bus indicated at bus 1 and a second auxiliary bus indicated at bus 2. In the example shown there are three lines L1, L2 and L3 connected to the bus. In the example shown the lines are all feeder lines for receiving current from the bus but it will be appreciated that the example shown is only part of a total power scheme at the power station.

Thus line 1 is connected to Bus 1 and has a breaker B1connected therebetween. Similarly line 1 is connected to Bus 2 and has a breaker B1A connected therebetween. In order to disconnect current flowing in line 1 in the event of a fault, therefore, it is necessary to actuate B1 and B1A. Similarly line 2 is connected to Bus 1 and Bus 2 through breakers B2 and B2A and line 3 is connected to Bus 1 and Bus 2 by breakers B3 and B3A.

It is well known in the prior art that the current in the line is detected by current transformers at the breakers so that for line 1 there is a current transformer CT1 at the breaker B1 and the second current transformer CT2 at the breaker B1A.

Thus the current flowing in line L1 is equal to the sum of the currents detected by the current transformers CT1 and CT2. In the prior art, therefore, these currents are summed at a summation point S1 in which the output current from each of the current transformer CT1 and CT2 is simply connected together for supply through a connector line C1 to an input terminal T1 of the line relay LR.

It will be appreciated that the electrical power system is of a conventional three phase type so that the current transformers at all points in the system have three components for detecting the A phase, B phase and C phase respectively and these provide three separate outputs which are connected at terminal T1. For convenience of illustration, however, the three separate outputs are not shown and only a single summation point S1 and connector C1 is shown.

In symmetrical manner, each of the lines L2 and L3 includes current transformers CT2 and CT2A and CT3 and CT3A respectively. In addition lines L1 and L2 have a separate line relay LR, none of which are illustrated again for convenience of illustration.

Further, line L1 includes a voltage transformer VT1 which provides a signal which is applied to a terminal T2 on the line relay LR.

The conventional line relay monitoring unit for example the type supplied by APT Power receives the inputs indicative of the current and voltage on the line L1 and provide a processing component P1 which calculates from those signals digital values of the current and voltage.

The line relay further includes a second processing component P2 which includes a series of protection algorithms of a conventional nature which calculate from the digital values of the current and voltage various protection factors which allow the system to detect a fault condition and to provide a trip output in a processing component P3 when a fault condition is detected.

As the algorithms and the systems for calculating those algorithms are well known to one skilled in the art from conventional electrical power technology and from the above commercially available unit, no further description of these will be included herein.

It is suffice to say that when a fault condition is detected, the processing component P3 generates a trip output from a terminal T3 which is communicated to the breakers B1 and B1A. These breakers therefore are activated to disconnect the line L1 from the buses to thus halt flow of current in the line L1.

The line relay further includes a processing component P4 which acts to record the digital values of the current and voltage at or around a fault condition and/or at or around any other actuation of the breakers B1 and B1A so as to provide records of the operation of the breakers for diagnostic and maintenance purposes.

It will be appreciated that the above description of the line relay system is simplified to its basic components and there are further input and output terminals for receiving information from other similar devices which can be used in the protection algorithms for enhanced calculation of a fault condition. Similarly the device provides outputs which can be communicated to other similar devices for assisting those devices in the calculation of fault conditions.

As an entirely separate system to the monitoring unit LR, it is necessary for safety purposes to provide a monitoring system which ensures that there is no breaker failure. It will be appreciated that the failure of a breaker to properly open in a fault condition can lead to catastrophic consequences in which current continues to flow in the faulty line leading to transmission of that fault condition into other areas of the network.

It is necessary therefore to provide in the prior art system a breaker fail system which includes a breaker fail detector BF1 which is responsive to the current flowing through breaker B1 as detected by the current transformer CT1. Similarly there is provided a breaker fail detector BF1A which is associated with the breaker B1A and receives an indication of the current from current transformer CT1A.

Breaker fail detector BF1 is also of course responsive to the trigger signal from terminal T3 so that it is activated by a signal to the breaker B1. In the event of a trigger signal to breaker B1 and in the event of current continuing to flow as detected by current transformer CT1, breaker fail indicator BF1 acts to trigger each of the breakers B1, B2 and B3 to disconnect all of the lines from Bus 1.

Similarly breaker fail detector BF1A is activated in the event that breaker B1A fails to open to trigger all of the breakers B1A, B2A and B3A to effect opening of each of those breakers to disconnect all of the lines from Bus 2.

In this way the separate breaker fail system ensures that in the event that a fault develops on one of the lines activating a trigger of the breakers to that line, where one of those breakers fails, the remaining breakers connected to that bus are opened thus preventing the fault on the faulty line from being communicated through the bus to the remaining lines.

This breaker fault protection system has been established for approximately twenty years and is essential in all ring bus systems of this type.

Figure 2:
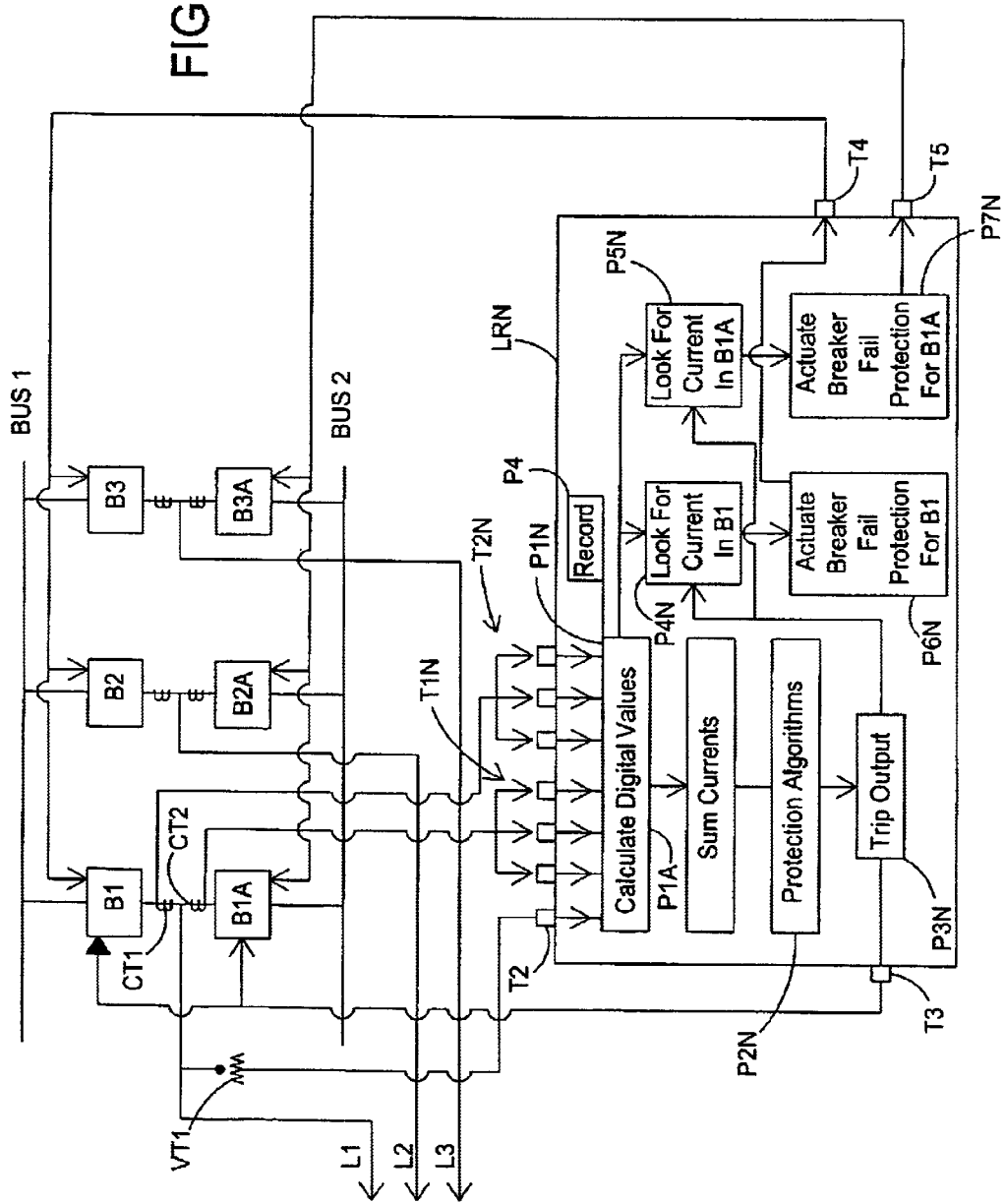
FIG. 2 is a similar schematic illustration of a scheme according to the present invention.

Turning now to the present invention as shown in FIG. 2 the same electrical power system is monitored and controlled using a single line relay LRN which carries out for the line L1 both the monitoring action for the operation of the breakers B1 and B1A and also the breaker fail monitoring.

The line relay LRN is therefore modified in that it includes two terminals T1N and T2N which directly receive the signals from the current transformers CT1 and CT2. Thus each terminal T1N and T2N includes three input terminal elements for receiving for each current transformer signals proportional to the A phase, B phase and C phase respectively.

The line relay LRN includes the first processor component P1N which acts to calculate digital values for each of the six current signals and for the voltage signals from the terminal T2. These digital values are sent to a second processor component P1A which acts to generate a sum from the digital values for the A phase, B phase and C phase respectively by adding the current components from the terminals T1N and T2N in digital form.

Based upon the summation of the A phase, B phase and C phase together with the value of the voltage, the protection algorithms as previously described are calculated in the processor section P2N for generating the trip output and the processor section P3N as previously described.

Thus in the event that the protection algorithms determines the presence of a fault condition the trip output is actuated to generate a trip signal to the breakers B1 and B1A.

In addition the trip output is communicated to a further processing component P4N and a second processing component P5N each of which receives from the digital value component P1N the digital values of the six individual currents of the A phase, B phase and C phase from the terminals T1N and T2N. The component 4N thus looks for current values greater than zero form the terminal T1N in the event of a trip signal from the trip output P3N. Similarly the component P5N looks for current values greater than zero from the terminal T2N again in the event of a trip output component P3N. In the event of determination of a current greater than zero through breaker B1, the processor component P4N actuates the breaker fail protection component P6N which provides an output signal at terminal T4 which supplies a trip signal to the breakers B1 B2 and B3. Symmetrically the processor component P5N looks for current in the breaker B1A and in the event of detecting a current greater than zero actuates processor P7N which generates an output at terminal T5 which acts to trip the breakers B1A, B2A and B3A.

The new line relay of the arrangement of FIG. 2 therefore performs its line protection function with two sets of current inputs. Summation of the individual line breaker current is performed in the relay to generate line currents. As the current summation occurs after each breaker current passes through the unit, other intelligent electronic devices such as redundant relays, controllers etc. can be supplied with line current.

This has the following advantages:

The system can improve breaker maintenance by reviewing breaker performance for every breaker operation by recording the individual breaker currents at the breaking action in the recording system P4.

The system can provide reduced cost for breaker failing implementation by providing breaker failure as an integrated protection function.

There is a significant reduction in wiring requirements for current circuits and an elimination of the need for auxiliary contact status points in the breaker protection system.

The unit provides breaker failure capability within the unit itself for ring bus applications.

Individual breaker current applications are recorded for example using 96 samples per cycle of oscillography. This can be used to determine how long each breaker takes to open or close based upon individual breaker currents.

Functions such as open disconnect are derived using individual breaker currents without the need for auxiliary contact inputs.

The protection system can operate from an internal breaker fail detection or from an external signal indicating breaker fail to generate the breaker fail output at T4 or T5. A time delay of 200 ms can be used to delay breaker logic initiation.

Within the device is a functional ability available to the end user that to combine internal protection functions using Boolean operators into specific customized ancillary protections. As an example current measured by individual breakers can be used to operate overcurrent elements associated with that particular breaker. The summation of the currents can then be looked at by the summated line overcurrent relay. In this way, current flowing through the bus but not on the line would result in individual breaker current overcurrent devices picking up but would not see line overcurrent (operating on summated current) operation.

Figure 3:
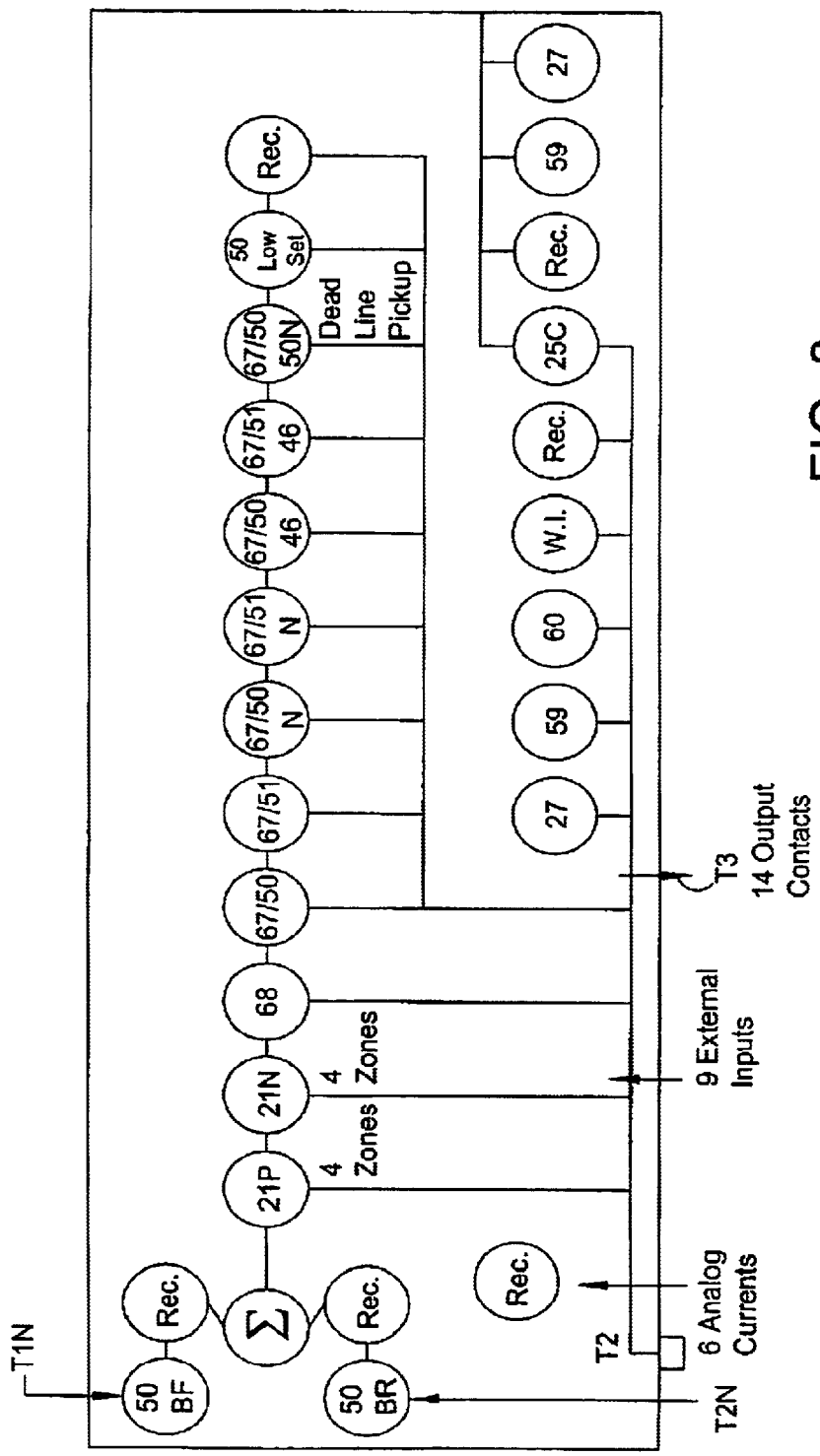
FIG. 3 is a further schematic illustration of one unit according to the present invention showing one example of the particular algorithm components for monitoring the currents of fault condition.

FIG. 3 is a further schematic illustration of one unit according to the present invention showing one example of the particular algorithm components for monitoring the currents of fault condition. The particular components are identified by the code numbers from the IEEE standard identified hereinbefore.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. Apparatus for monitoring current flow in a power supply line of a three phase electrical power system and for controlling circuit breakers to provided protection for the system, the system comprising:

a ring bus assembly including a first bus and an auxiliary bus;

a plurality of three phase power supply lines each connected to the first bus and to the auxiliary bus for communicate power current between the respective line and the ring bus assembly;

a plurality of first circuit breakers each connected between a respective one of the lines and the first bus for disconnecting flow of current therebetween;

a plurality of second circuit breakers each connected between a respective one of the lines and the auxiliary bus for disconnecting flow of current therebetween;

a first plurality of current sensors each responsive to the three phase current flow between the first bus and a respective one of the lines to provide three outputs indicative of the A-phase, B-phase and C-phase respectively of the three phase current flow;

a second plurality of current sensors each responsive to the three phase current flow between the auxiliary bus and a respective one of the lines to provide three outputs indicative of the A-phase, B-phase and C-phase respectively of the three phase current flow;

and a plurality of voltage sensors each responsive to the voltage on a respective one of the lines to provide a voltage output indicative thereof;

the apparatus comprising a monitoring and control unit associated with a respective one of the lines having:

six current input terminals each for receiving a respective one of the three outputs of the first current sensor and the three outputs of the second current sensor associated with said respective one of the lines;

a voltage input terminal for receiving the voltage output of the voltage sensor associated with said respective one of the lines;

detector means in the unit responsive to the outputs from the terminals for generating data indicative of the instantaneous values of the voltage and of the six currents defined by the A-phase, B-phase and C-phase currents of the first sensor and the A-phase, B-phase and C-phase currents of the second sensor;

summation means in the unit for summing the two A-phases to define an A-phase summed value, the two B- phases to define an B-phase summed value and the two C-phases to define an C-phase summed value;

calculation means in the unit for effecting predetermined algorithmic calculations on the voltage, the A-phase summed value, on the B-phase summed value and on the C-phase summed value to determine a fault condition;

a trip output generator for generating a trip output in response to said fault condition for tripping both the circuit breakers associated with said respective line;

recording means for recording data relating to said six current values in the event of a fault condition;

said calculation means being arranged, in the event of a trip output, to detect current values defined by the A-phase, B-phase and C-phase currents of the first sensor which are greater than zero and to provide a first breaker fail output for tripping all the first circuit breakers;

said calculation means being arranged, in the event of a trip output, to detect current values defined by the A-phase, B-phase and C-phase currents of the second sensor which are greater than zero and to provide a second breaker fail output for tripping all the second circuit breakers.

2. A method comprising:

providing a ring bus assembly including a first bus and an auxiliary bus;

providing a plurality of three phase power supply lines;

connecting each three phase power supply line to the first bus and to the auxiliary bus for communicating power current between the respective line and the ring bus assembly;

locating between each one of the lines and the first bus a respective one of a plurality of first circuit breakers for disconnecting flow of current therebetween;

locating between each one of the lines and the auxiliary bus a respective one of a plurality of second circuit breakers for disconnecting flow of current therebetween;

providing a first plurality of current sensors each responsive to the three phase current flow between the first bus and a respective one of the lines to provide three outputs indicative of the A-phase, B-phase and C-phase respectively of the three phase current flow;

providing a second plurality of current sensors each responsive to the three phase current flow between the auxiliary bus and a respective one of the lines to provide three outputs indicative of the A-phase, B-phase and C-phase respectively of the three phase current flow;

providing a plurality of voltage sensors each responsive to the voltage on a respective one of the lines to provide a voltage output indicative thereof;

providing a plurality of monitoring and control units each associated with a respective one of the lines;

providing on each unit six current input terminals and connecting thereto a respective one of the three outputs of the first current sensor and the three outputs of the second current sensor associated with said respective one of the lines;

providing on each unit a voltage input terminal and connecting thereto the voltage output of the voltage sensor associated with said respective one of the lines;

in response to the outputs from the terminals, generating data indicative of the instantaneous values of the voltage and of the six currents defined by the A-phase, B-phase and C-phase currents of the first sensor and the A-phase, B-phase and C-phase currents of the second sensor;

in each unit effecting summing of the two A-phases to define an A-phase summed value, of the two B-phases to define an B-phase summed value and of the two C-phases to define an C-phase summed value;

in each unit effecting pre-determined algorithmic calculations on the voltage, the A-phase summed value, on the B-phase summed value and on the C-phase summed value to determine a fault condition;

in each unit generating a trip output in response to said fault condition for tripping both the circuit breakers associated with said respective line;

in the event of a fault condition, recording data relating to said six current values;

in the event of a trip output, detecting current values defined by the A-phase, B-phase and C-phase currents of the first sensor which are greater than zero in response thereto generating a first breaker fail output for tripping all the first circuit breakers;

and in the event of a trip output, detecting current values defined by the A-phase, B-phase and C-phase currents of the second sensor which are greater than zero in response thereto generating a second breaker fail output for tripping all the second circuit breakers.

3. The method according to claim 2 wherein the first breaker fail outputs are communicated directly to the first breakers and the second breaker fail outputs are communicated directly to the second breakers.

4. The method according to claim 2 wherein the currents are calculated in the unit to define a digital value and summed digitally.

* * * * *